United States Patent
Cha et al.

(10) Patent No.: US 8,533,605 B1
(45) Date of Patent: Sep. 10, 2013

(54) DEVICE EXPERIENCE ADAPTATION BASED ON SCHEDULES AND EVENTS

(75) Inventors: Tae-Woo Cha, Overland Park, KS (US); R. Brian Landers, Leawood, KS (US); Michael P. McMullen, Leawood, KS (US); Jonathan C. Ochenas, Lenexa, KS (US); Kristin L. Simeroth, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/537,563

(22) Filed: Jun. 29, 2012

Related U.S. Application Data (63) Continuation of application No. 13/029,103, filed on Feb. 16, 2011, now Pat. No. 8,244,277.

(51) Int. Cl.
*G06F 3/00* (2006.01)

(52) U.S. Cl.
USPC ............ 715/744; 715/745; 715/747; 715/811

(58) Field of Classification Search
USPC .................. 455/414.1, 456.3; 715/744, 745, 715/747, 811
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,622,016 B1 | 9/2003 | Sladek et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,072,653 B1 | 7/2006 | Sladek et al. | |
| 7,073,130 B2 * | 7/2006 | Novak et al. ............... | 715/744 |
| 7,215,754 B1 | 5/2007 | Woodson et al. | |
| 7,260,382 B1 | 8/2007 | Lamb et al. | |
| 7,260,386 B1 | 8/2007 | Haldar et al. | |
| 7,500,198 B2 * | 3/2009 | Mathews et al. ............. | 715/744 |
| 8,244,277 B1 | 8/2012 | Cha et al. | |
| 8,265,658 B2 * | 9/2012 | Issa et al. ................... | 455/456.3 |
| 8,315,198 B2 | 11/2012 | Corneille et al. | |
| 2002/0029169 A1 | 3/2002 | Oki et al. | |
| 2002/0054086 A1 * | 5/2002 | Van Oostenbrugge et al. ........................ | 345/744 |

(Continued)

OTHER PUBLICATIONS

Ackerman, Samuel K., "Lecture Slides: Mapping User Interface Design to Culture Dimensions", Aaron Marcus and Associates, Inc., 2001.

(Continued)

*Primary Examiner* — Michael Roswell (57) ABSTRACT

A portable electronic device is provided comprising a processor, a memory, a loading application stored in the memory that accesses loading criteria for a first, second, and third ID wherein the criteria comprise measures of relative importance applied to variables associated with each of the IDs and wherein the IDs comprise at least one of an application, a media file, and a widget. The system determines a current value of at least one variable wherein variables comprise at least one of day of the week, time of day, and geographic location of the device and additionally comprise a first, a second, and a third event status associated with the first, second, and third ID, respectively. The system applies the criteria to the current values of the variables to determine a composite loading factor for each of the IDs and loads one of the IDs based on the factor.

20 Claims, 6 Drawing Sheets

(56) References Cited

U.S. PATENT DOCUMENTS

| | | | |
|---|---|---|---|
| 2002/0054150 A1 | 5/2002 | I'Anson et al. | |
| 2002/0101444 A1 | 8/2002 | Novak et al. | |
| 2002/0123335 A1 | 9/2002 | Luna et al. | |
| 2002/0167542 A1 | 11/2002 | Florin | |
| 2003/0233329 A1 | 12/2003 | Laraki et al. | |
| 2004/0044752 A1 | 3/2004 | Hamaguchi et al. | |
| 2004/0179034 A1 | 9/2004 | Burritt | |
| 2004/0181678 A1 | 9/2004 | Lee et al. | |
| 2004/0203941 A1 | 10/2004 | Kaplan et al. | |
| 2004/0216054 A1* | 10/2004 | Mathews et al. | 715/765 |
| 2005/0071780 A1 | 3/2005 | Muller et al. | |
| 2005/0085272 A1 | 4/2005 | Anderson et al. | |
| 2006/0048141 A1 | 3/2006 | Persson et al. | |
| 2006/0085751 A1 | 4/2006 | O'Brien et al. | |
| 2006/0092861 A1 | 5/2006 | Corday et al. | |
| 2006/0258289 A1 | 11/2006 | Dua | |
| 2006/0277469 A1 | 12/2006 | Chaudhri et al. | |
| 2007/0067738 A1 | 3/2007 | Flynt et al. | |
| 2007/0265023 A1 | 11/2007 | Bengtsson et al. | |
| 2007/0268842 A1 | 11/2007 | Wang | |
| 2007/0282914 A1 | 12/2007 | Sivapragasam et al. | |
| 2008/0034309 A1 | 2/2008 | Louch et al. | |
| 2008/0092057 A1* | 4/2008 | Monson et al. | 715/744 |
| 2008/0214172 A1 | 9/2008 | Anwer | |
| 2008/0319887 A1 | 12/2008 | Pizzi et al. | |
| 2009/0017870 A1 | 1/2009 | An | |
| 2009/0077495 A1* | 3/2009 | Bhat et al. | 715/811 |
| 2009/0181716 A1 | 7/2009 | Benco et al. | |
| 2009/0228824 A1 | 9/2009 | Forstall et al. | |
| 2010/0005196 A1 | 1/2010 | Wolff-Petersen | |
| 2010/0190478 A1 | 7/2010 | Brewer et al. | |
| 2010/0197219 A1 | 8/2010 | Issa et al. | |
| 2010/0234051 A1 | 9/2010 | Holden et al. | |
| 2010/0281427 A1* | 11/2010 | Ghosh et al. | 715/811 |
| 2011/0161149 A1 | 6/2011 | Kaplan | |
| 2012/0102547 A1 | 4/2012 | Fransdonk | |

OTHER PUBLICATIONS

Hollister, Sean, "Apple patent app hints at iPod-based phones, Peel 520 turns shades of green, red, blue and yellow," Engadget, http://www.engadget.com/2010/09/19/apple-patent-app-hints-at-ipod-based-phones-peel-520-turns-shad/, Sep. 19, 2010, p. 1.

Kenja's Newsletter, About Newsletter, http://kenja.net/news.main.html, printed from the World Wide Web, "last modified Fri, Oct. 10, 2003".

Openwave, "Comparison of WAP Push and Short Message Service (SMS)," Openwave Systems, Inc., Redwood City, CA, Apr. 2002.

Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.

Stanford Technology Ventures Program, "Danger, Inc.: Powering the Next Generation of Mobile Technology", Oct. 15, 2003.

Wolter, Eric, Patent Application entitled "Method and System for Calendar-Based Delivery of Themed User Interface Skins," filed Dec. 9, 2008, U.S. Appl. No. 12/330,759.

Wolter, Eric S., Patent Application entitled "Method and System for Delivery of User-Interface Skins, Applications, and Services to Wireless Devices," filed Jan. 17, 2006, U.S. Appl. No. 11/333,964.

Delker, Jason R., et al., Patent Application entitled "Provisioning System and Methods for Interfaceless Phone," filed Sep. 6, 2010, U.S. Appl. No. 12/876,220.

Delker, Jason R., et al., Patent Application entitled "System and Method for ID Platform," filed Feb. 8, 2011, U.S. Appl. No. 13/023,486.

Delker, Jason R., et al., Patent Application entitled "Dynamic Loading, Unloading, and Caching of Alternate Complete Interfaces," filed Sep. 6, 2010, U.S. Appl. No. 12/876,221.

Delker, Jason R., et al., Patent Application entitled "Shared ID with Second Party," filed Jan. 31, 2011, U.S. Appl. No. 13/018,083.

Delker, Jason R., et al., Patent Application entitled "Extending ID to a Computer System," filed May 27, 2011, U.S. Appl. No. 13/118,058.

Davis, John M., et al., Patent Application entitled "Mirroring Device Interface Components for Content Sharing," filed Mar. 10, 2011, U.S. Appl. No. 13/045,292.

Cha, Tae-Woo, et al., Patent Application entitled "Device Experience Adaptation Based on Schedules and Events," filed Feb. 16, 2011, U.S. Appl. No. 13/029,103.

Smith, Nathan A., et al., Patent Application entitled "Restricted Testing Access for Electronic Device," filed Jun. 16, 2011, U.S. Appl. No. 13/161,496.

Katzer, Robin Dale, et al., Patent Application entitled "Zone Architecture for Dynamic Targeted Content Creation," filed Oct. 11, 2011, U.S. Appl. No. 13/271,207.

Delker, Jason R., et al., Patent Application entitled "Ad Sponsored Communication Pack," filed Feb. 18, 2011, U.S. Appl. No. 13/031,123.

First Action Interview Pre-Interview Communication dated Apr. 24, 2012, U.S. Appl. No. 12/876,220, filed Sep. 6, 2010.

Office Action—Restriction Requirement dated Feb. 1, 2012, U.S. Appl. No. 12/876,221, filed Sep. 6, 2010.

FAIPP Office Action dated May 10, 2012, U.S. Appl. No. 12/876,221, filed Sep. 6, 2010.

FAIPP Pre-Interview Communication dated Jul. 19, 2012, U.S. Appl. No. 13/018,083, filed Jan. 31, 2011.

Notice of Allowance dated Mar. 30, 2012, U.S. Appl. No. 13/029,103, filed Feb. 16, 2011.

Office Action dated Apr. 15, 2008, U.S. Appl. No. 11/046,083, filed Jan. 28, 2005.

Final Office Action dated Oct. 28, 2008, U.S. Appl. No. 11/046,083, filed Jan. 28, 2005.

Office Action dated Aug. 15, 2011, U.S. Appl. No. 12/330,759, filed Dec. 9, 2008.

Office Action dated Apr. 3, 2008, U.S. Appl. No. 11/333,964, filed Jan. 17, 2006.

Final Office Action dated Oct. 8, 2008, U.S. Appl. No. 11/333,964, filed Jan. 17, 2006.

Final Office Action dated Jan. 21, 2009, U.S. Appl. No. 11/333,964, filed Jan. 17, 2006.

Advisory Action dated Apr. 13, 2009, U.S. Appl. No. 11/333,964, filed Jan. 17, 2006.

Office Action dated Jun. 23, 2009, U.S. Appl. No. 11/333,964, filed Jan. 17, 2006.

Final Office Action dated May 11, 2010, U.S. Appl. No. 11/333,964, filed Jan. 17, 2006.

Advisory Action dated Jul. 22, 2010, U.S. Appl. No. 11/333,964, filed Jan. 17, 2006.

Pre-Interview Communication dated Feb. 26, 2013, U.S. Appl. No. 13/023,486, filed Feb. 8, 2011.

Final Office Action dated Jan. 11, 2013, U.S. Appl. No. 12/876,221, filed Sep. 6, 2010.

Pre-Interview Communication dated Feb. 26, 2013, U.S. Appl. No. 13/118,058, filed May 27, 2011.

Office Action dated Mar. 14, 2013, U.S. Appl. No. 13/161,496, filed Jun. 16, 2011.

Delker, Jason R., et al., Patent Application entitled "Transition Experience During Loading and Updating an Interface and Applications Pack," filed Oct. 24, 2012, U.S. Appl. No. 13/659,889.

Annan, Brandon C., et al., Patent Application entitled, "Traffic Management of Third Party Applications", filed Jul. 31, 2012, U.S. Appl. No. 13/536,709.

Notice of Allowance dated Jun. 4, 2013, U.S. Appl. No. 13/023,486, filed on Feb. 8, 2011.

Advisory Action dated Apr. 23, 2013, U.S. Appl. No. 12/876,221 filed on Sep. 6, 2010.
Notice of Allowance dated Jul. 2, 2013, U.S. Appl. No. 12/876,221 filed on Sep. 6, 2010.
Final Office Action dated May 10, 2013 U.S. Appl. No. 13/018,083, filed on Jan. 31, 2011.

First Action Interview Office Action dated May 6, 2013, U.S. Appl. No. 13/118,058, filed on May 27, 2011.
Notice of Allowance dated Jun. 27, 2013, U.S. Appl. No. 13/161,496, filed on June 16, 2011.

* cited by examiner

DEVICE EXPERIENCE ADAPTATION BASED ON SCHEDULES AND EVENTS

CROSS-REFERENCE TO RELATED APPLICATIONS

This application is a continuation of and claims priority under 35 U.S.C. §120 to U.S. patent application Ser. No. 13/029,103, filed on Feb. 16, 2011, entitled "Device Experience Adaptation Based on Schedules and Events," by Tae-Woo Cha, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are portable electronic devices used for radio telecommunication over a cellular network of base transceiver stations. Mobile telephones allow users to make and receive telephone calls to and from the public telephone network which includes other mobile devices as well as fixed-line phones. Mobile phones connect to the public telephone network by accessing a cellular network owned by a mobile network operator. Cellular networks enable mobile telephone calls to proceed seamlessly even when the user is moving around wide geographic areas via handoff by base transceiver stations. Mobile telephones also support many additional services and accessories such as short message service (SMS), or text, messaging, electronic mail, Internet access, gaming, camera, and global positioning systems (GPS). Components commonly found on all mobile telephones comprise a rechargeable battery providing the power source and an input mechanism and display to allow the user to interact with the telephone. The most common input mechanism is a keypad, but touch screens and voice activation functionality are found in higher-end mobile phones. Many mobile phones also comprise a subscriber identity module (SIM) on a removable card.

SUMMARY

In an embodiment, a portable electronic device is provided comprising a processor, a memory, a loading application stored in the memory, that, when executed on the portable electronic device, accesses loading criteria for a first ID, a second ID, and a third ID wherein the loading criteria comprise measures of relative importance applied to variables associated with each of the IDs and wherein the IDs comprise at least one of an application, a media file, and a widget. The system also determines a current value of at least one variable wherein variables comprise at least one of day of the week, time of day, and geographic location of the portable electronic device and additionally comprise a first event status associated with the first ID, a second event status associated with the second ID, and a third event status associated with the third ID. The system also applies the loading criteria to the current values of the variables to determine a composite loading factor for each of the first ID, the second ID, and the third ID. The system also loads one of the first ID, the second ID, and the third ID based on the composite loading factor.

In an embodiment, a processor-implemented method is provided. The method comprises a portable electronic device loading a first ID based on applying predetermined loading criteria to current values of variables, wherein each variable is associated with one of day of the week, time of day, and geographic location of the portable electronic device and wherein the ID comprises at least one of an application, a media file, and a widget. The method also comprises the portable electronic device determining a first event to describe in the ID wherein the first event is based on a topic associated with the ID. The method also comprises the portable electronic device presenting within a window associated with the ID a first item of content based on a first geographic location of the portable electronic device and based on a first phase of the first event. The method also comprises the portable electronic device determining that the first phase of the event has concluded and determining that a second phase of the event has commenced. The method also comprises the portable electronic device presenting within a window associated with the ID a second item of content based on a second geographic location of the device and based on the second phase of the first event.

In an embodiment, a processor-implemented method is provided. The method comprises a portable electronic device loading a first ID based on applying predetermined loading criteria to current values of variables, wherein each variable is associated with one of day of the week, time of day, and geographic location of the portable electronic device and wherein the first ID comprises at least one of an application, a media file, and a widget. The method also comprises the portable electronic device presenting a first theme associated with the first ID based on a first context of the portable electronic device wherein presenting the first theme comprises presenting at least one of a first application, a first media file, and a first widget associated with the first ID. The method also comprises the portable electronic device determining that the first context has changed from a first state to a second state. The method also comprises the portable electronic device presenting a second theme associated with the first ID based on a second context of the portable electronic device wherein presenting the second theme comprises presenting at least one of a second application, a second media file, and a second widget associated with the first ID. The method also comprises the portable electronic device determining that the second context has changed from a third state to a fourth state. The method also comprises the portable electronic device loading a second ID based on the change of the second context from the third state to the fourth state.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods that promote a portable electronic device to access and load bundles of applications, media files, and widgets, referred to as IDs, using automated installation routines based on variables including the day, the time, the location of the device, and the occurrence of events of interest to a user of the device. As used herein, an ID is a unified bundle of electronic content comprising at least one of an application, network services, a wallpaper, a media file, a widget, and a screensaver along with an auto-installation routine or application which may be used to provide a custom look and functionality to a portable electronic device. The auto-installation routine or application automatically manages downloading the several components of the ID onto the device and the making of some configuration settings on the device. This saves the user from having to go to a plurality of different locations and download the several components of the ID in a series of distinct transactions. A widget is a small specialized graphical user interface (GUI) application that provides some visual information and easy access to frequently used functions such as clocks, calendars, and news aggregators.

A loading application executing on the portable electronic device periodically determines values for the variables and applies predefined weights or loading criteria to the variables to calculate which ID to load. The IDs may be obtained from trusted content providers and the applications, media files, and/or widgets contained therein and their installation routines may be tested and precertified. The ID may become a portion or element of the user interface for the portable electronic device until the ID is unloaded and replaced by another ID comprising other applications, media files, and widgets. IDs may be based on topics or subject matter areas such as the user's profession and various leisure interests. The unloading and replacement of one ID for another ID may be based on calculations by the loading application as well as by user input. In some circumstances, rather than unloading a first ID and loading a second ID, a plurality of IDs may be loaded and/or cached on the device, and the loading application may deactivate the first ID and then activate the second ID. The unloading of a first ID and load a second ID—or the deactivation of a first ID and the activation of a second ID—based on a schedule and/or events may be referred to as adapting a user experience of the device based on schedules and events.

While the portable electronic device in a typical configuration described herein may load one designated ID at one time and may load another ID at other times, according to a predefined schedule, the present disclosure teaches that IDs may be loaded and unloaded based on the occurrence of events of interest, stages or phases of events, and unplanned or unscheduled events or incidents. An ID normally loaded at a specific time on a weekday may be preempted when an event or incident occurs that the system determines to be of particular interest given the user's previous behaviors. Events detected by the loading application that may prompt an exchange of loaded IDs or an exchange of applications, media files, and widgets within an already loaded ID may be scheduled such as sporting or cultural events. Events may also be unscheduled and incident-related, such as a flight delay, weather occurrence, or traffic problem determined to affect the user. The loading application may be configured to unload one application, media file, or widget and replace it with another application, media file, or widget within a loaded ID when, for example, something takes place at a sporting event not currently featured by a loaded application, media file, and widget that is determined to be of importance to the user. The loading application may unload at least one currently loaded and executing application within the ID, for instance, providing information about a different ongoing sporting event and replace it with a media file displaying information for the sporting event associated with the breaking news. An unscheduled event or incident such as a rain delay at a monitored baseball game may result in a coincident football game becoming actively featured, for example.

The present disclosure provides for the detection of context-related factors for the portable electronic device, for example changes in location, motions of the device, and ambient light and/or ambient noise detected by the device. When these factors are combined with detected phases of an event, the loading application may continually update the content provided in the active ID. Depending upon whether a user is driving to an event, attending the event, or leaving the event, for example, the loading application may present different content. An unexpected occurrence or incident such as a weather-related delay of a game, traffic problems after the game, or a call from the user's office regarding an urgent business development may prompt the removal of the loaded ID by the loading application and replacement with a different ID featuring applications, media files, and widgets relevant to the incident.

Figure 1:
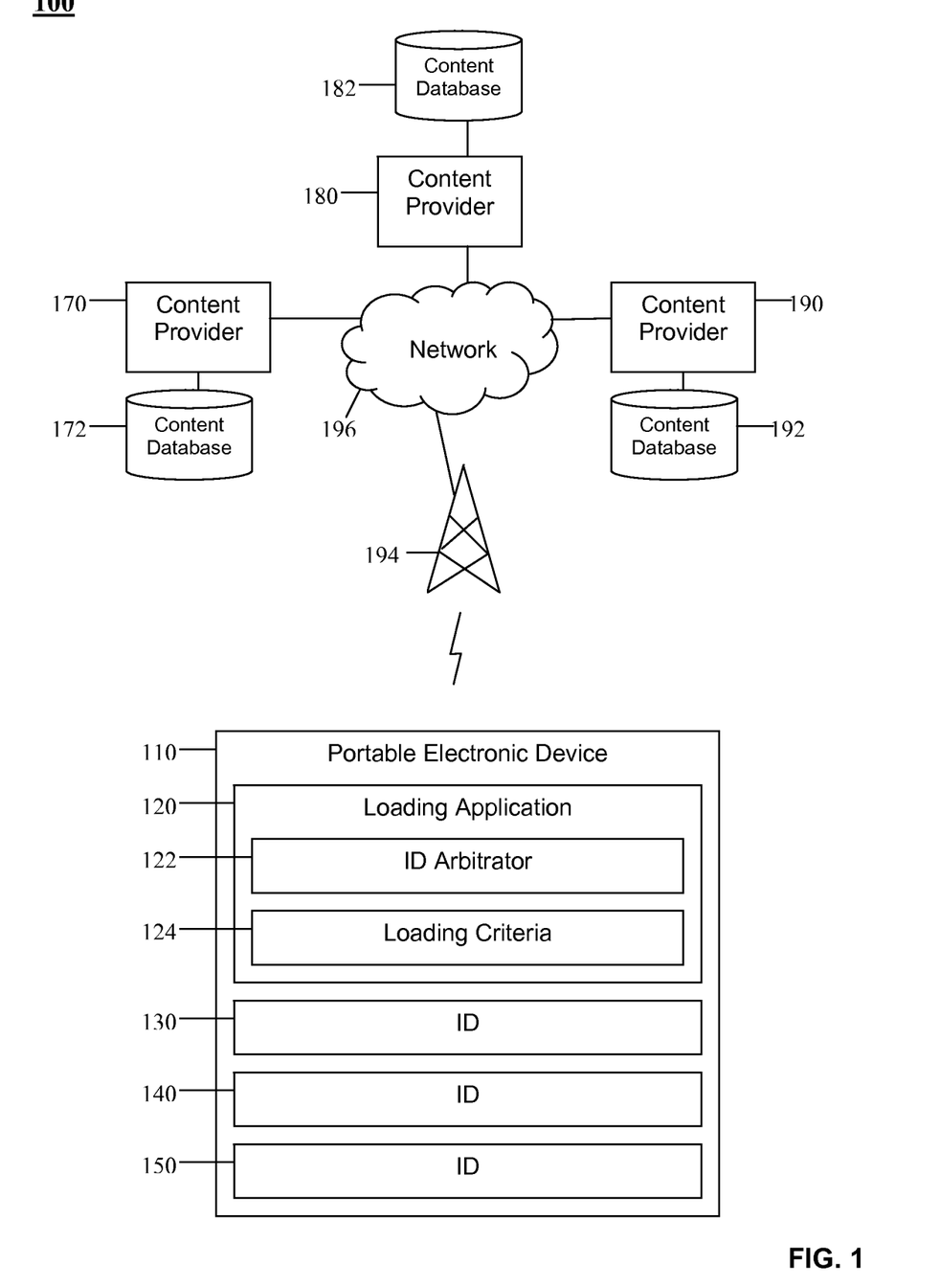
FIG. 1 is a block diagram of a system according to an embodiment of the disclosure.

Turning now to FIG. 1, a system 100 is described. The system 100 comprises a portable electronic device 110, a loading application 120, an ID arbitrator 122, loading criteria 124, and IDs 130, 140, 150. The system 100 also comprises content providers 170, 180, 190, content databases 172, 182, 192, a base transceiver station 194, and a network 196.

The loading application 120 executes on the portable electronic device 110. Portable electronic devices 110 are described in detail hereinafter. The loading application 120 downloads applications, media files, and/or widgets for loading within the IDs 130, 140, 150 from one or more of the content providers 170, 180, 190. When loaded on the portable electronic device 110, the IDs 130, 140, 150 may become portions or elements of the user interface or user experience for the portable electronic device 110. Each one of the IDs 130, 140, 150, that include automated installation routines or applications, may provide a portion of the user interface for the portable electronic device 110. In an embodiment, the loading application 120 may download the IDs 130, 140, 150 as a unity, for example as a bundle containing one or more application, media file, and/or widget.

IDs 130, 140, 150 may be associated with topics such as a user's occupation and leisure interests. The loading of IDs by the loading application 120 may be calendar-driven or schedule-driven such that the loading application 120 may be configured to load specific IDs 130, 140, 150 based on the day of the week and the time of day. The loading of IDs 130, 140, 150 by the loading application 120 may additionally be driven by contextual factors such as the location and movement of the portable electronic device 110 and events occurring wherein the user of the portable electronic device 110 may be physically present or events in which the user has expressed an interest and wishes to remotely monitor and receive live or recorded content feeds, for example. The loading application 120 may apply loading criteria 124 to variables such as the day of the week, the time of day, the location of the portable electronic device 110, and status of events of interest to determine the ID 130 to activate and the applications, media files, and/or widgets to load in association with the ID 130. The loading criteria 124 may be configurable by the user and may reflect the user's preferences for the type of content desired. The variables such as day, time, location, and event status may be assigned numerical or other values or coding for use in conjunction with the loading criteria 124 to determine the ID 130, 140, 150 to load The loading application 120 contains functionality to detect the occurrence of events and incidents associated with IDs 130, 140, 150, to determine the importance of an event or incident based on expressed preferences as well as previous user behavior, and change applications, media files, and/or widgets within a currently activated ID 130. The loading application 120 may also cause the currently activated ID 130 to be replaced with an alternate ID 140 if the loading application 120 detects the occurrence of an event or incident associated with the topic or subject matter of the ID 140 of an importance justifying such a change. This may occur for events and incidents that occur without the user's immediate awareness. The unscheduled loading of the alternate ID 140 may serve as an alert to the user of the occurrence of an incident that may well warrant the user's immediate or prompt attention. It is understood that while the loading application 120 may promote loading a plurality of IDs 130, 140, 150 to the portable electronic device 110, for example requesting the IDs 130, 140, 150—or their constituent applications, media files, and/or widgets—from the content providers 170, 180, 190, the loading application 120 may further promote storing and/or caching of the IDs 130, 140, 150 on the portable electronic device 110. Rather than unloading the first ID 130 and loading the second ID 140, the loading application 120 may instead deactivate the first ID 130, which remains stored and/or cached on the portable electronic device 110, and activate the second ID 130, which had been stored and/or cached on the portable electronic device 110 while the first ID 130 had been active.

IDs 130, 140, 150 comprise a unified plurality of applications, media files, and/or widgets along with installation routines or applications, that when loaded may comprise portions or elements of the user interface for the portable electronic device 110. IDs 130, 140, 150 may comprise media files, web widgets, tiles, really simple syndication (RSS) feed icons, media players, wallpapers, themes, ring tones, and listings of internet links. Installable software components that access a plurality of network services, for example call tones, also may be included. Applications, media files, and/or widgets may be downloaded from content providers 170, 180, 190 that are known and trusted by the portable electronic device 110 and the applications, media files, and/or widgets may install using loading routines included with the IDs 130, 140, 150 that have been tested and approved. Alternatively, the IDs 130, 140, 150 may be downloaded as a unity, for example as a bundle of one or more application, media file, and/or widget along with installation routines or applications. Although IDs 130, 140, 150 may be designed or constructed by an independent provider such as one of the content providers 170, 180, 190, the IDs 130, 140, 150 may still be maintained by a telecommunications service provider providing wireless services or stored in the portable electronic device 110 as described herein.

Applications, media files, and widgets may provide content that is specific to the respective ID 130, 140, 150 active in the portable electronic device 110 at a given time. For example, the ID 130 may be configured to provide content associated with the user's profession or occupation. The applications, media files, and/or widgets associated with the ID 130 may therefore provide information related to professional interests of the user. If the user is a business executive, the ID 130 may include a web widget providing a feed of stock price information. The ID 130 for the executive may also include a really simple syndication (RSS) feed icon providing near real time access to confidential web log, hereinafter blog, entries made by senior executives of the user's employer. If the user of the portable electronic device 110 is a physician, the ID 130 may comprise a plurality of ring tones with a first ring tone associated with the physician's office, a second ring tone associated with a hospital intensive care unit, and a third ring tone associated with the physician's golf professional. The ID 130 for the physician may also comprise a media player providing live or recorded audio proceedings of a medical symposium that the physician may listen to between patient visits or while driving or walking between his or her office and hospital.

The ID 140 may, for example, be configured to provide content associated with the user's leisure interests in contrast with the professional- or occupational-related content associated with the ID 130. The user of the portable electronic device 110 may configure the topic of the ID 140 to have a sports orientation, for example. The ID 140 may include an application, media file, or widget that maintains a continuously open session with a sports-oriented internet site providing regularly updated sports scores. The ID 140 may also include another application that provides a network service allowing the user to place wagers on rugby matches taking place in the user's home country.

The ID 150 may be configured to provide content associated with other interests or activities of the user, for example cultural or religious interests. The ID 150 may include an application, media file, or widget that provides a continuous feed of popular show tunes, religious music, or biblical readings, for example. The ID 150 may also include another application, media file, or widget that provides internet access via subscription to recently published bestseller novels that the user may read while on an extended railroad trip or during an airport layover or flight delay.

The present disclosure provides for each of the IDs 130, 140, 150 to furnish content via applications, media files, and/or widgets associated with topics or subject matter areas. In the examples provided above, the ID 130 delivers content for the user's professional interests, and the IDs 140, 150 deliver content for leisure time interests such as sports and cultural interests, respectively. The system and methods may also provide for subtopics or themes to be specified within topics of a particular ID 140, for example. If the ID 140 is configured for a sports topic, individual themes could be configured within the ID 140 for different sports, for example one theme for rugby and one theme for cricket. At a particular time when the ID 140 is loaded, for example in the evening or on a weekend, the user may select the rugby theme to be featured instead of the cricket theme, or vice versa. While the rugby theme may be featured during a given time period with applications, media files, and/or widgets germane to rugby subject matter provided, if the loading application 120 detects that a significant incident has occurred in the cricket sports community, it may interrupt the presentation of the rugby subject matter with the activation of an application, media file, or widget providing the cricket-related subject matter. In this example, the application, media file, or widget may be a link to an internet site providing live or recorded video feeds of cricket material. The loading application 120 may be configured to interrupt an actively featured theme in various ways depending on the time of year and the gravity of incident that may be a candidate for use in interrupting the actively featured theme about another sporting subject. The loading application 120 comprises the ID arbitrator 122 that makes determinations about such interruptions. Based on determinations provided by the ID arbitrator 122, the loading application 120 may cause the installation routines or applications associated with the IDs 130, 140, 150 to fully exchange IDs 130, 140, 150 or effect an interruption as described above.

While the user may exercise manual control over the particular ID 130, 140, 150 that may be activated on the portable electronic device 110 at a given time as well as the applications, media files, and/or widgets provided within the activated ID 130, 140, 150, respectively, the loading application 120 may be configured to cause one of the IDs 130, 140, 150 to be automatically loaded under specific conditions. Those conditions may be described in the loading criteria 124 that the user may configure and change at the user's election. The loading criteria 124 may specify weights or other measures to apply to variables that may comprise, for example, the days of the week, the times of day, and specific geographic locations of the portable electronic device 110 wherein one of the IDs 130, 140, 150 may be activated. The loading application 120 may periodically check internal or external calendars and clocks to determine the day of the week and time of day and may use a global positioning system (GPS) or other technologies to determine the geographic location of the portable electronic device 110. Upon determining the values of these variables, the loading application 120 may apply the loading criteria 124 to these values to calculate a composite loading factor to determine which ID 130, 140, 150 to activate as well as determine when to deactivate a currently activated ID 130 and activate another ID 140, 150. The loading application 120 may be configured to refresh the values of variables on a regular basis, for example several times per hour. The loading application 120 may then apply the loading criteria 124 to the newly determined values of the variables to determine if the ID 130, 140, 150 and any of the applications, media files, and/or widgets presented with the ID 130, 140, 150 should be changed.

The loading criteria 124 may be configured such that when the loading criteria 124 are applied to the variables and the current value of a day of the week variable is one of Monday through Friday and the time of day variable is business hours, the ID 130, in the example related to the user's professional interests, is activated and the applications, media files, and/or widgets are loaded within the ID 130. By contrast, when the loading application 120 determines that the day of the week is a Saturday or Sunday and/or the time of day is not business hours, the loading application 120 may instead activate the ID 140 based on sports or other leisure interests of the user or activate the ID 150 based on the cultural or religious interests of the user in the example provided. Because variables measured by the loading application 120 comprise geographic location of the portable electronic device 110 as well as events, the loading application 120 may make a determination based on geographic location and an ongoing event known to be of interest to the user to overrule day of the week and time of day variables and load a sports or leisure oriented ID 140, 150. In an example, it may be Wednesday at 3:00 PM but the location of the portable electronic device 110 may be determined to be a baseball stadium, and the loading application 120 may also determine that a baseball game is beginning at that location. The loading criteria 124 read by the loading application 120 and applied to these variables may result in the ID 130 normally loaded on Wednesday afternoons for the user's professional interests to be unloaded and replaced by the ID 140 for sports interests. The user, that may be attending the baseball game, may configure one of the applications, media files, or widgets available within the ID 140, to provide internet radio commentary of the baseball game.

The IDs 130, 140, 150 are described herein as interchangeable bundles of applications, media files, and/or widgets that may be selectively loaded and activated based on the application of predefined loading criteria 124 to variables such as day, time, physical location, and the occurrence of events and incidents known or inferred to be of interest to the user. The IDs 130, 140, 150 may be based on topics such as professional interests, leisure time interests such as sports, or cultural or religious interests. As noted, the applications, media files, and/or widgets selected for use within respective IDs 130, 140, 150 may present subject matter associated with the topic of the respective ID 130, 140, 150. The content matter and the applications, media files, and/or widgets themselves delivering the content may be provided by content providers 170, 180, 190 that are trusted to assure that content does not contain viruses, for instance. The content providers 170, 180, 190 are also relied upon to assure that installation routines for applications, media files, and/or widgets install rapidly and may call for minimal or no user intervention.

In an embodiment, when the portable electronic device 110 is initially acquired by the user and activated for service, the portable electronic device 110 may not have a user interface immediately available for user access. After self-activation for wireless services with the telecommunications service provider, the portable electronic device 110 may reboot and the loading application 120 or a similar application may execute on the portable electronic device 110 and provide access to a remote software repository. The software repository may be provided by the telecommunications service provider, by one of the content providers 170, 180, 190, or by another entity. The software repository contains a selection of customized and unified bundles of applications, media files, and/or widgets that may be precertified and trusted. The bundles may effectively be IDs 130, 140, 150. The customized bundle selected by the user is downloaded to the portable electronic device 110, uncompressed, and installed. The installation may take place automatically without user action. The applications, media files, and/or widgets associated with the respective ID 130, 140, 150 chosen are installed and automatically configured to comprise portions or elements of the initial interface and user experience for the device.

Similar to the initial installation of the ID 130, 140, 150 on the portable electronic device 110 that becomes a portion of the initial interface, other IDs 130, 140, 150 may be loaded, unloaded, cached, and reloaded at subsequent times and under specific conditions, such as when the portable electronic device 110 is detected to enter a particular location, for example a retail store or an entertainment venue. While the initial set of applications, media files, and/or widgets associated with the ID 130 obtained from the telecommunications service provider may comprise portions of the default interface if the user chooses, other IDs 140, 150 may be loaded with the user's approval and substitute for the applications, media files, and/or widgets associated with the default interface. When the portable electronic device 110 is detected to enter a retail store by technology located at the retail store, for example, Wi-Fi functionality of the portable electronic device 110 may be turned on, and the ID 140 associated with the retail store may be temporarily loaded on the portable electronic device 110. The ID 140 may comprise applications, media files, and/or widgets providing a floor map of the retail store, in-store radio providing music and announcements of promotions, and special messages to the portable electronic device 110 based on previous shopping behavior by the user. When the portable electronic device 110 exits the retail store, the ID 140 may be unloaded, and another ID 130 may be reloaded.

For further details about IDs and loading IDs see U.S. patent application Ser. No. 12/876,220, filed Sep. 6, 2010, entitled "Provisioning System and Methods for Interfaceless Phone" by Jason R. Delker, et al., and U.S. patent application Ser. No. 12/876,221, filed Sep. 6, 2010, entitled "Dynamic Loading/Unloading/Caching of Alternate Complete Interfaces" by Jason Delker, et al., which are herein incorporated by reference.

Content providers 170, 180, 190 may be private producers and distributors of professional, academic, entertainment, and sports content. Content providers 170, 180, 190 may be cable and/or broadcast television companies, movie studios, and internet site operators that create, aggregate, and distribute wireless content. The content providers 170, 180, 190 maintain the content databases 172, 182, 192, respectively, wherein content is stored and extracted for distribution to portable electronic devices 110 running the loading application 120 and associated components. The content providers 170, 180, 190 may create all or portions of the IDs 130, 140, 150 and the applications, media files, and/or widgets provided to function within the IDs 130, 140, 150. The content providers 170, 180, 190 may stream some content on a live or recorded basis to the portable electronic device 110 as provided by the application, media file, or widget. The content may be accessible by the portable electronic device 110 from the content providers 170, 180, 190 on a paid subscription basis.

Because the content providers 170, 180, 190 may provide full IDs 130, 140, 150 with component applications, media files, and/or widgets, respectively, in bundles wherein the applications, media files, and/or widgets are trusted and secure and have installation routines that are automated, the content providers 170, 180, 190 may work in cooperation with the telecommunications service provider. As discussed above, when the portable electronic device 110 is first received by the user, it may not have a user interface that the user may access. The portable electronic device 110 may receive its initial ID 130 and component applications, media files, and/or widgets from the telecommunications service provider. The telecommunications service provider may sponsor a program as described herein wherein the portable electronic device 110 may download, install, remove, cache, and reload interchangeable IDs 130, 140, 150 and their component applications, media files, and/or widgets. The telecommunications service provider may provide guidelines or requirements for applications, media files, and/or widgets and installation routines provided by content providers 170, 180, 190 to be tested and certified as trustworthy. The applications, media files, and/or widgets and installation routines provided by content providers 170, 180, 190 may be provided to the telecommunications service provider for distribution or may be provided directly to the portable electronic device 110.

The system and methods described herein provide for IDs 130, 140, 150 and their component applications, media files, and widgets to be loaded and unloaded based on contextual factors in addition to the regularly measured variables such as day of the week, time of day, and location of the portable electronic device 110. Contextual factors may comprise the phase of an event, the location of the portable electronic device 110 at a given phase, environmental factors associated with the event and its current phase such as a rain delay at a game or heavy traffic before or after the game, and detected ambient light or noise, for example the dimming of house lights at an opera or theatrical performance. While the loading application 120 on a periodic basis may apply user-specified loading criteria 124 to the variables to select and load an ID 130, the loading application 120 also regularly polls for information from a plurality of sources including content providers 170, 180, 190. The loading application 120 may combine information about ongoing events at which the portable electronic device 110 may or may not be present with contextual information associated with the portable electronic device 110 such as its location, an event occurring at the location, the stage or phase of the event, ambient noise and light, and physical motions of the portable electronic device 110. Each of these contextual factors alone or in various combinations when taken in conjunction with the described day, time, and location variables may suggest the loading of an ID 130, 140, 150 and the loading of specific applications, media files, and/or widgets, respectively, within the loaded ID 130, 140, 150. The loading application 120 may further combine the contextual information with stored information about previous behaviors and tendencies of the user of the portable electronic device 110 in various situations.

While the periodic scheduled application of predefined loading criteria 124 to day, time, and location variables may provide guidelines for standard loading of IDs 130, 140, 150 in default-type situations wherein no special events or conditions are occurring, the loading application 120 may continually poll for information about events and incidents that may bear upon decisions about changes to IDs 130, 140, 150 and their component applications, media files, and/or widgets, respectively, to load. In addition to the events themselves that receive monitoring, the loading application 120 combines information about the particular phase of the event with contextual information about the portable electronic device 110. When the loading application 120 detects that a relevant event is a baseball game and detects that the user is driving to the game, for example, the loading application 120 may cause the ID 140 to be loaded and provide pre-game commentary, map information and other content via a widget or link to an internet site. At some point during the game, the loading application 120 may receive information about an exciting development at a different game. The loading application 120 may determine, from previous stored information, that the user may wish to be provided instantaneous information about the development at the other game. The loading application 120 may interrupt whatever content the ID 140 is providing at the time to alert the user to the development at the other game. The user may be provided a video segment displaying the exciting play or other occurrence at the other game. When the game or other event the user is attending is ended, i.e., the phase of the event changes, the ID 140 may change the content to post game analysis or traffic reports. The decision to provide traffic reports may be based partly on the loading application 120 detecting that the vehicle associated with the portable electronic device 110 is moving or based on an incident or unscheduled event such as a traffic accident occurring near the stadium or other event venue that may bear upon the user's decision on when and how to depart the area of the stadium.

The loading application 120 may learn about preferences and habits of the user of the portable electronic device 110 and anticipate the user's needs. Combining this user-specific information, information about phase of event attended or otherwise monitored by the user, relevant incidents, and input about movement or motion of the portable electronic device 110 may leverage the value of various contextual information to enhance the user experience. The portable electronic device 110 may also detect ambient light and ambient noise conditions and feed this information to the loading application 120 for its use in making determinations about activating applications, media files, and/or widgets or changing settings of the portable electronic device 110, for example increasing or decreasing ring tone or other audio volume. If the user is detected to be attending a theatrical event, the loading application 120 may turn down the volume settings of the portable electronic device 110. When the environment in which the portable electronic device 110 is situated is determined to be dark and/or quiet, such as inside of a theater, the loading application 120 may adjust volume or brightness of display. When the environment may be loud, such as in a restaurant and the currently loaded ID 140 is associated with a sports topic, the volume of the portable electronic device 110 may be turned up. These adjustments are not made in isolation and are rather made after consideration of other environmental and contextual factors as well as the day, time, and location variables and the loading criteria 124 periodically applied to them.

The portable electronic device 110 may be a mobile telephone, a media player, and a personal digital assistant (PDA). In addition to having a radio transceiver to exchange transmissions with the base transceiver station 194 for wireless voice and data communications, the portable electronic device 110 also may contain hardware and software providing WiFi functionality that may be used in connection with the portable electronic device 110 visiting commercial and other venues as described above. The portable electronic device 110, alternatively or in addition to WiFi technology, may comprise other hardware and software associated with other wireless local area network technologies that may observe the IEEE (Institute of Electrical and Electronics Engineers) 802.11 set of standards.

The base transceiver station 194 may be any of a cellular wireless base station, for example a Code Division Multiple Access (CDMA), a Global System for Mobile Communications (GSM), a Universal Mobile Communications System (UMTS), and/or Long-term Evolution (LTE) cellular wireless base station; a Worldwide Interoperability for Microwave Access (WiMAX) base station; a WiFi access point; a femtocell; or other wireless access devices. While FIG. 1 depicts only one base transceiver station 194, in an embodiment a plurality of base transceiver stations 194 may be existent and in operation.

The network 196 promotes communication between the components of the system 100. The network 196 may be any communication network including a public data network (PDN), a public switched telephone network (PSTN), a private network, and/or a combination.

Figure 2:
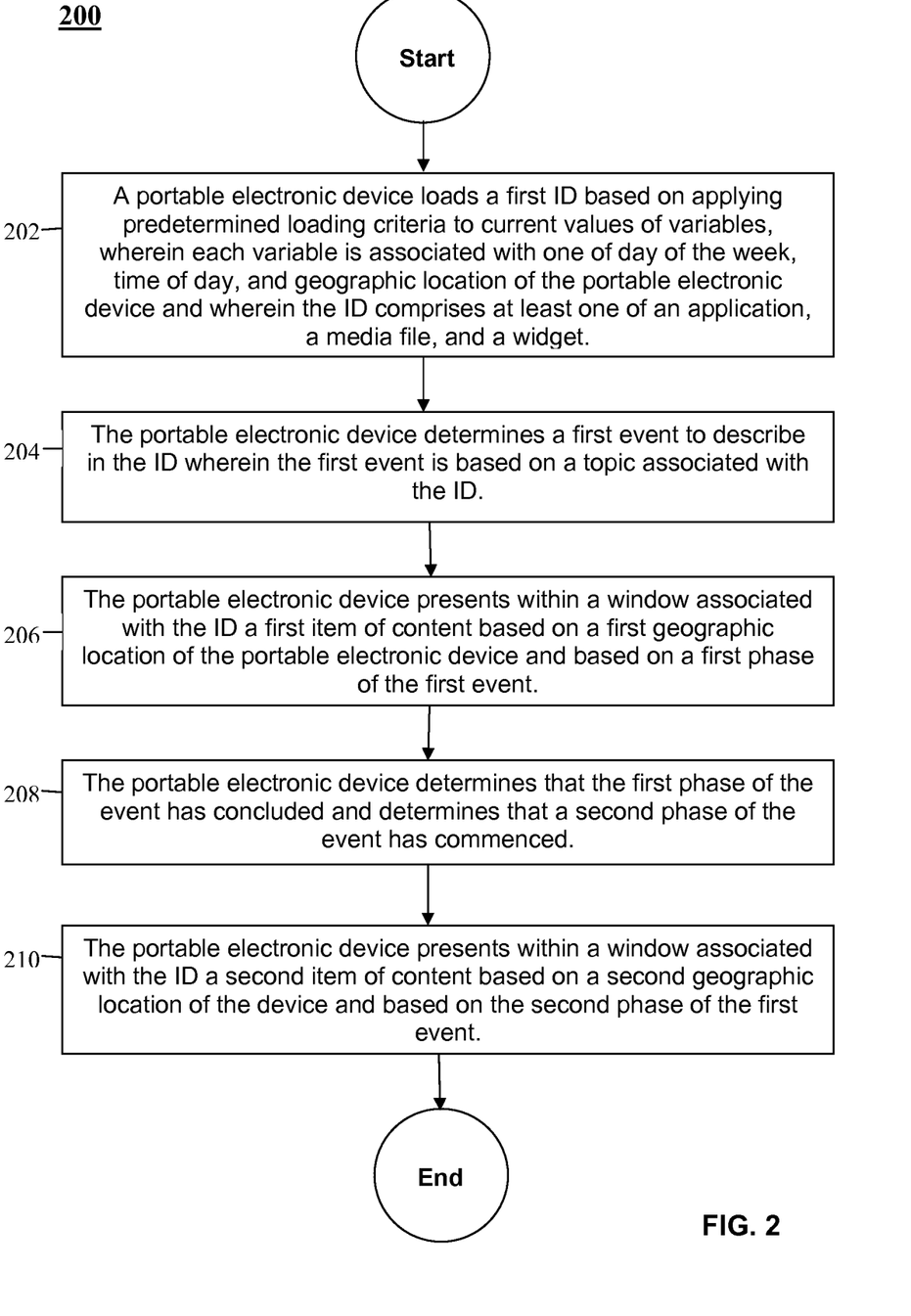
FIG. 2 is a flow chart illustrating a method according to an embodiment of the disclosure.

Turning now to FIG. 2, a method 200 is described. Beginning at block 202, a portable electronic device loads a first ID based on applying predetermined loading criteria to current values of variables, wherein each variable is associated with one of day of the week, time of day, and geographic location of the portable electronic device and wherein the ID comprises at least one of an application, a media file, and a widget. At block 204, the portable electronic device determines a first event to describe in the ID wherein the first event is based on a topic associated with the ID.

At block 206, the portable electronic device presents within a window associated with the ID a first item of content based on a first geographic location of the portable electronic device and based on a first phase of the first event. At block 208, the portable electronic device determines that the first phase of the event has concluded and determines that a second phase of the event has commenced. At block 210, the portable electronic device presents within a window associated with the ID a second item of content based on a second geographic location of the device and based on the second phase of the first event.

Figure 3:
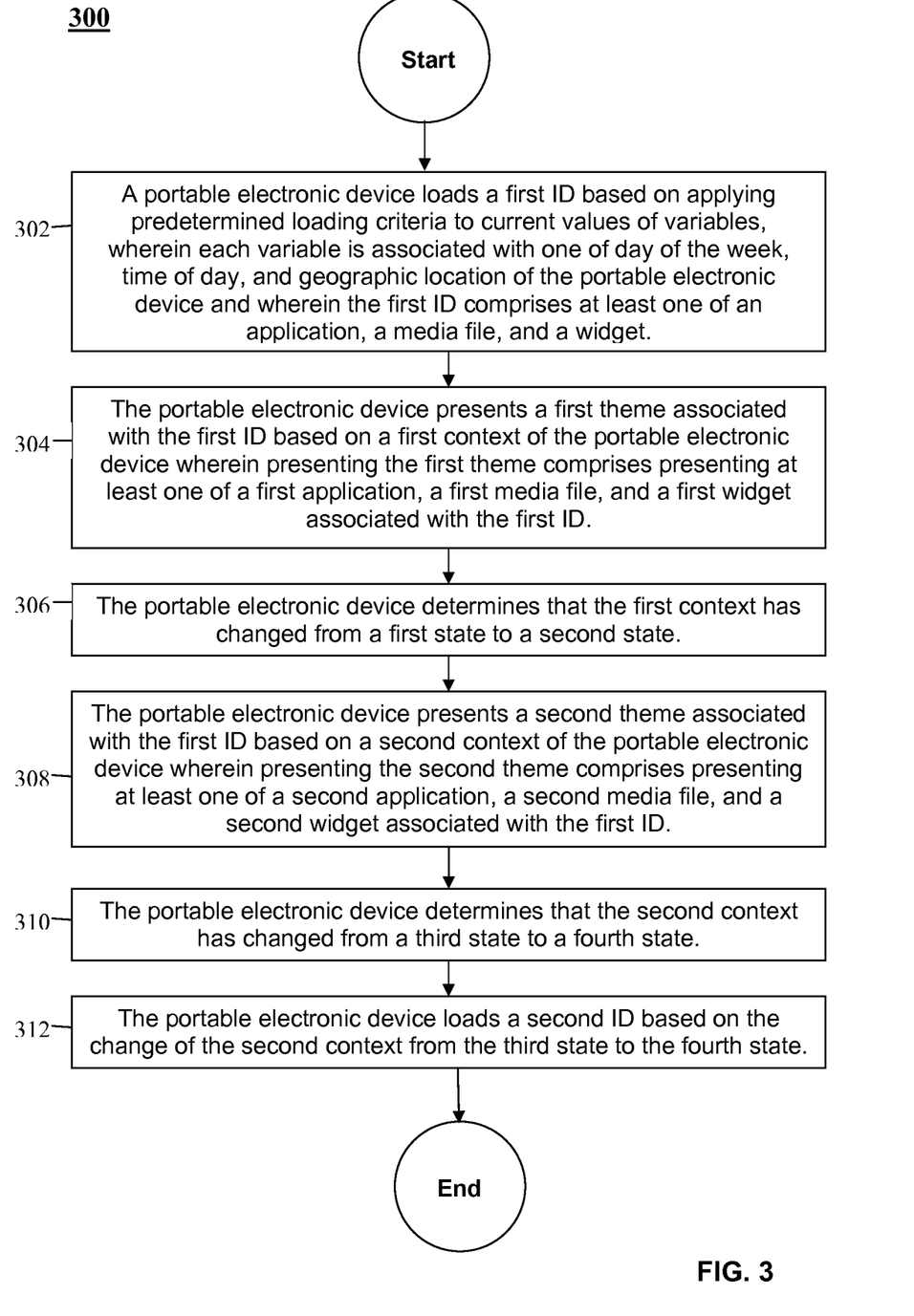
FIG. 3 is a flow chart illustrating a method according to an embodiment of the disclosure.

Turning now to FIG. 3, a method 300 is provided. Beginning at block 302, a portable electronic device loads a first ID based on applying predetermined loading criteria to current values of variables, wherein each variable is associated with one of day of the week, time of day, and geographic location of the portable electronic device and wherein the first ID comprises at least one of an application, a media file, and a widget. At block 304, the portable electronic device presents a first theme associated with the first ID based on a first context of the portable electronic device wherein presenting the first theme comprises presenting at least one of a first application, a first media file, and a first widget associated with the first ID.

At block 306, the portable electronic device determines that the first context has changed from a first state to a second state. At block 308, the portable electronic device presents a second theme associated with the first ID based on a second context of the portable electronic device wherein presenting the second theme comprises presenting at least one of a second application, a second media file, and a second widget associated with the first ID.

At block 310, the portable electronic device determines that the second context has changed from a third state to a fourth state. At block 312, the portable electronic device loads a second ID based on the change of the second context from the third state to the fourth state.

Figure 4:
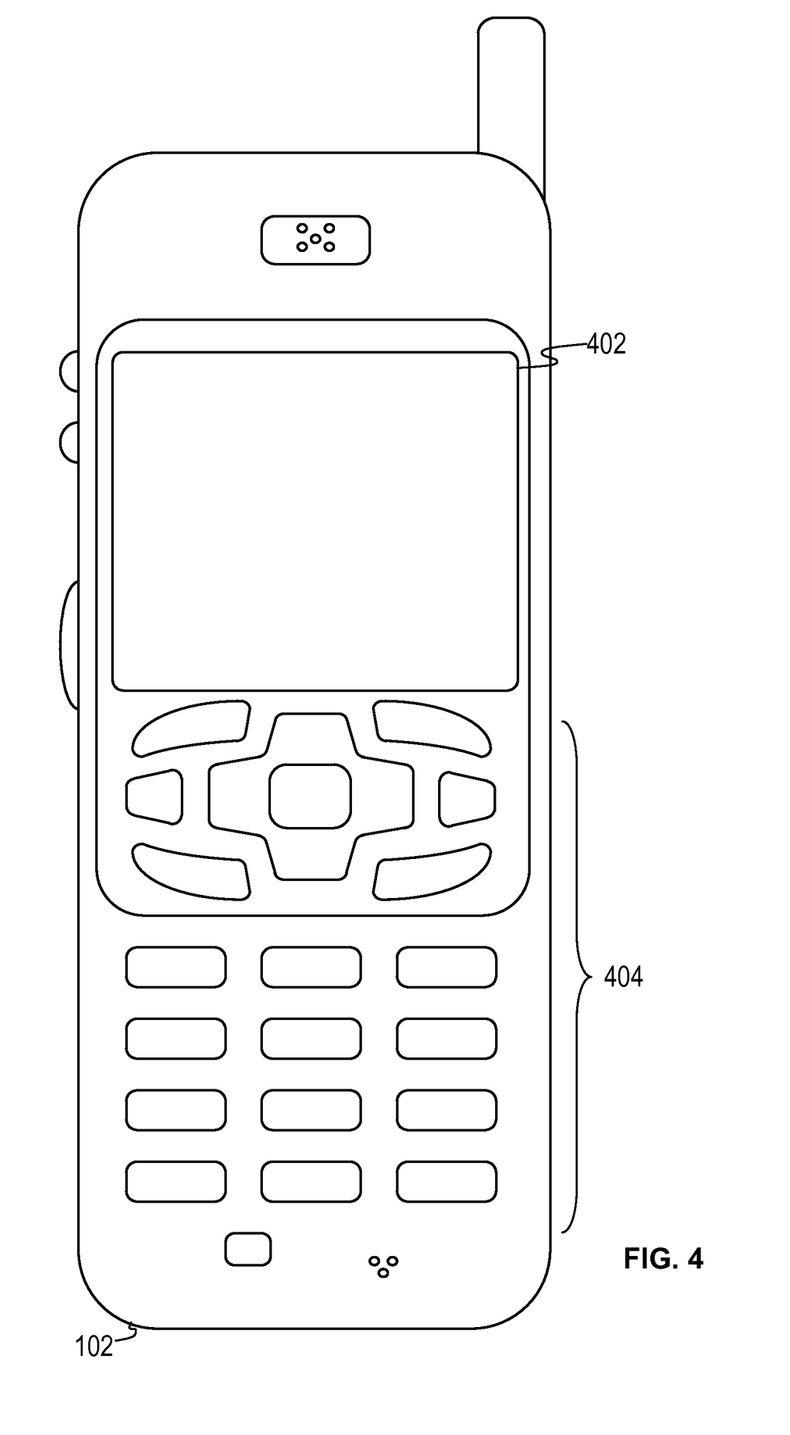
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the portable electronic device 110 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with the base transceiver station (BTS) 194 illustrated in FIG. 1, a wireless network access node, a peer mobile device 102 or any other wireless communication network or system. While a single base transceiver station 194 is illustrated, it is understood that the wireless communication system may comprise additional base transceiver stations. In some instances, the mobile device 102 may be in communication with multiple base transceiver stations 194 at the same time. The base transceiver station 194 (or wireless network access node) is coupled to a wired network 196, such as the Internet. Via the wireless link and the wired network, the mobile device 102 has access to information on various servers. Servers may provide content that may be shown on the display 402. Alternately, the mobile device 102 may access the base transceiver station 194 through a peer mobile device 102 acting as an intermediary, in a relay type or hop type of connection.

Figure 5:
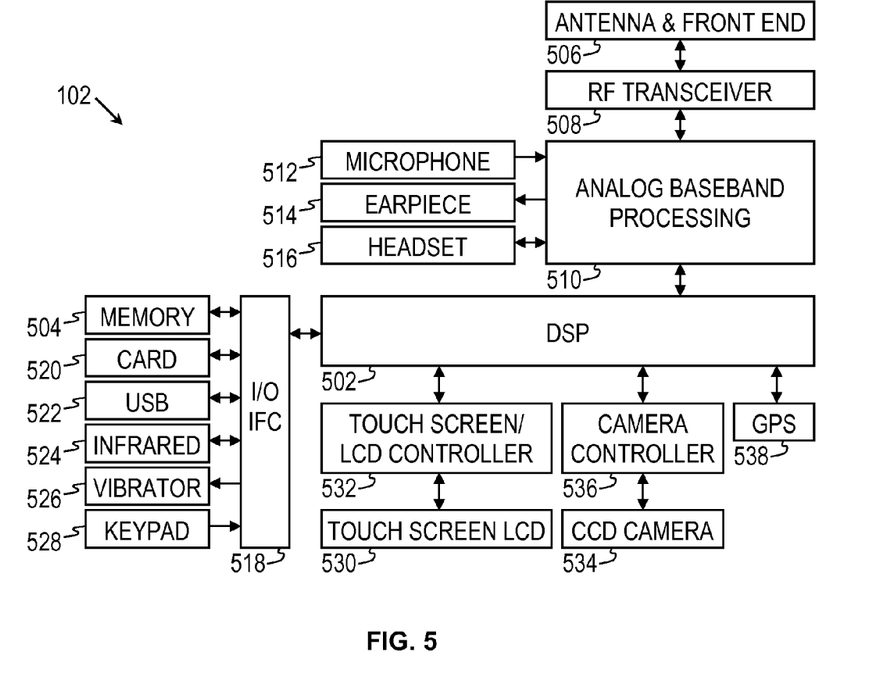
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
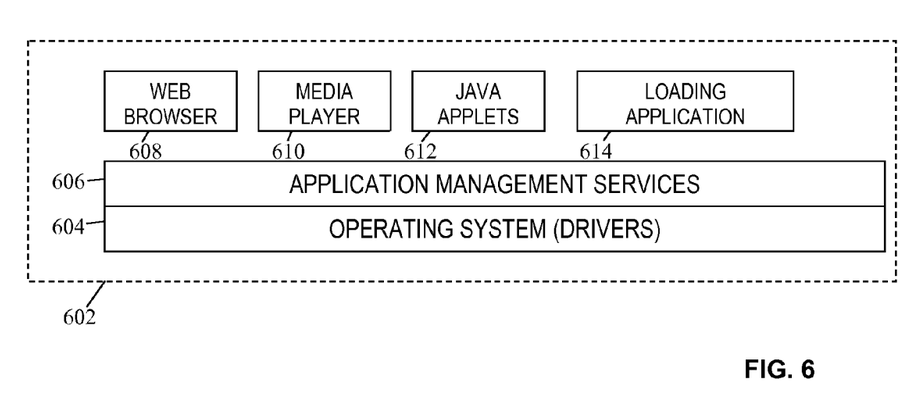
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The loading application 614 may correspond to the loading application 120 provided by the system 100.

Figure 7:
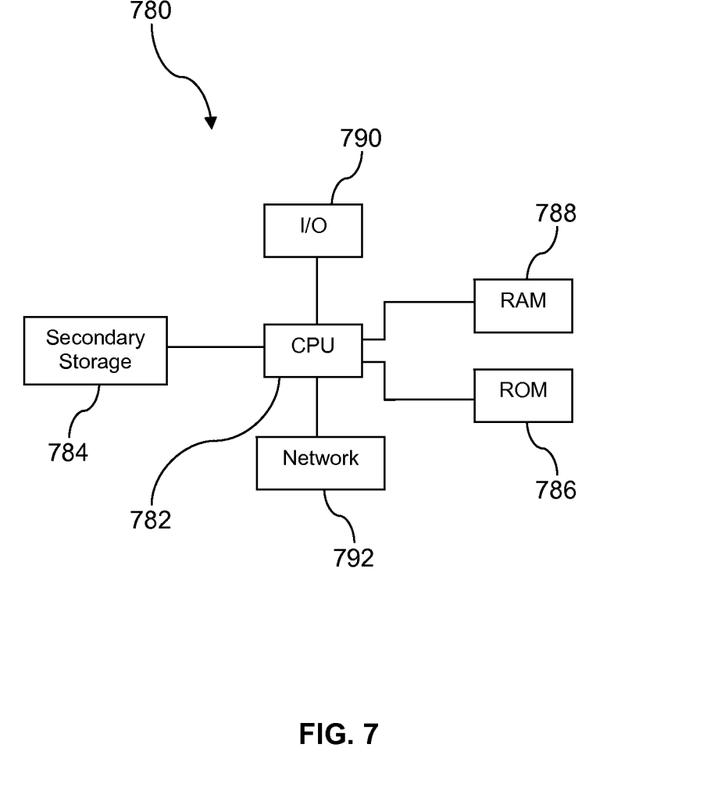
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784. The secondary storage 784, the RAM 788, and/or the ROM 786 may be referred to in some contexts as computer readable storage media and/or non-transitory computer readable media.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. These network connectivity devices 792 may enable the processor 782 to communicate with the Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 784, for example, hard drives, floppy disks, optical disks, and/or other device, the ROM 786, and/or the RAM 788 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data structures in part by directly accessing the computer program product, for example by reading from a CD-ROM disk inserted into a disk drive peripheral of the computer system 780. Alternatively, the processor 782 may process the executable instructions and/or data structures by remotely accessing the computer program product, for example by downloading the executable instructions and/or data structures from a remote server through the network connectivity devices 792. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

In some contexts, a baseband signal and/or a signal embodied in a carrier wave may be referred to as a transitory signal. In some contexts, the secondary storage 784, the ROM 786, and the RAM 788 may be referred to as a non-transitory computer readable medium or a computer readable storage media. A dynamic RAM embodiment of the RAM 788, likewise, may be referred to as a non-transitory computer readable medium in that while the dynamic RAM receives electrical power and is operated in accordance with its design, for example during a period of time during which the computer 780 is turned on and operational, the dynamic RAM stores information that is written to it. Similarly, the processor 782 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A portable electronic device that is one of a mobile phone, a media player, or a personal digital assistant (PDA), where a portion of the interface of the portable electronic device is provided by an ID, where IDs comprise an auto-installation routine or auto-installation application and comprise a unified plurality of at least three of an application, a media file, a network service, or a widget, comprising:
    a processor;
    a memory; and
    a loading application that leverages contextual information to enhance a user experience of the portable electronic device, stored in the memory, that, when executed on the portable electronic device,
        accesses loading criteria for a professional ID, a sports ID, and a cultural ID, wherein the loading criteria comprise measures of relative importance applied to variables associated with each of the IDs, and wherein the IDs comprise a unified plurality of at least three of an application, a media file, a network service, or a widget along with an auto-installation routine or auto-installation application,
        determines a current value of at least one variable, wherein variables comprise at least one of day of the week, time of day, and geographic location of the portable electronic device and additionally comprise a first event status associated with the professional ID, a second event status associated with the sports ID, and a third event status associated with the cultural ID,
        applies the loading criteria to the current values of the variables to determine a composite loading factor for each of the professional ID, the sports ID, and the cultural ID, and
        loads one of the professional ID, the sports ID, and the cultural ID based on the composite loading factor.

2. The system of claim 1, wherein each of the professional ID, the sports ID, and the cultural ID provides at least one of visual, audible, and interactive content under a topic, and wherein the topic comprises at least one theme.

3. The system of claim 2, wherein each topic is associated with at least one of professional subject matter, sporting events, cultural events, and religious events of interest to a user of the portable electronic device, and wherein under the sports ID associated with a topic related to sporting events, the loading application provides content associated with at least one of a football theme and a baseball theme.

4. The system of claim 2, wherein the portable electronic device selects at least one of an application, a media file, a network service, and a widget for display within an ID based on a topic associated with the ID and based on a theme associated with the topic.

5. The system of claim 1, wherein the portable electronic device periodically monitors a plurality of events associated with topics associated with IDs.

6. The system of claim 5, wherein the plurality of monitored events is associated with topics for the currently loaded ID and is associated with topics for IDs not currently loaded.

7. The system of claim 1, wherein based on detection of an occurrence of a second event associated with the sports ID and based on a determination of an event status of the second event, the loading application unloads the professional ID and loads the sports ID.

8. The system of claim 1, wherein media files comprise at least one of ring tones and wallpapers.

9. The system of claim 1, wherein the unified plurality of at least three of an application, a media file, a network service, or a widget are at least one of accessed from a local cache in the portable electronic device and accessed from a remote software distribution site.

10. A processor-implemented method for executing on a portable electronic device that is one of a mobile phone, a personal digital assistant (PDA), or a media player and that leverages contextual information to enhance a user experience of the portable electronic device, comprising:
    the portable electronic device loading one of a professional ID, a sports ID, and a cultural ID based on applying predetermined loading criteria to current values of variables, wherein each variable is associated with one of day of the week, time of day, and geographic location of the portable electronic device, and wherein the one of the professional ID, the sports ID, and the cultural ID comprises an auto-installation routine or an auto-installation application and comprises a unified plurality of at least three of an application, a media file, a network service, or a widget;
    the portable electronic device determining a first event to describe in the one of the professional ID, the sports ID, and the cultural ID, wherein the first event is based on a topic associated with the one of the professional ID, the sports ID, and the cultural ID;
    the portable electronic device presenting within a window associated with the one of the professional ID, the sports ID, and the cultural ID a first item of content based on a first geographic location of the portable electronic device and based on a first phase of the first event;
    the portable electronic device determining that the first phase of the event has concluded and determining that a second phase of the event has commenced; and
    the portable electronic device presenting within a window associated with the one of the professional ID, the sports ID, and the cultural ID a second item of content based on a second geographic location of the device and based on the second phase of the first event.

11. The method of claim 10, wherein the first event is one of a sporting event, a cultural event, and an event associated with professional subject matter of interest to a user of the portable electronic device.

12. The method of claim 10, wherein the one of the professional ID, the sports ID, and the cultural ID monitors the first event for unscheduled changes in phases of the first event.

13. The method of claim 10, further comprising;
    the portable electronic device analyzing motion cues associated with physical motions of the portable electronic device; and
    the portable electronic device presenting within a window associated with the one of the professional ID, the sports ID, and the cultural ID a third item of content based on analysis of the motion cues.

14. The method of claim 10, wherein the first phase comprises a first period of time prior to the commencement of the first event and the second phase comprises a second period of time after the commencement of the first event.

15. A processor-implemented method for executing on a portable electronic device that is one of a mobile phone, a personal digital assistant (PDA), or a media player and that leverages contextual information to enhance a user experience of the portable electronic device, comprising:
- a portable electronic device loading one of a professional ID, a sports ID, and a cultural ID based on applying predetermined loading criteria to current values of variables, wherein each variable is associated with one of day of the week, time of day, and geographic location of the portable electronic device, and wherein the one of the professional ID, the sports ID, and the cultural ID comprises an auto-installation routine or an auto-installation application and comprises a unified plurality of at least three of an application, a media file, a network service, or a widget;
- the portable electronic device presenting a first theme associated with the one of the professional ID, the sports ID, and the cultural ID based on a first context of the portable electronic device, wherein presenting the first theme comprises presenting at least one of a first application, a first media file, a first network service, and a first widget associated with the one of the professional ID, the sports ID, and the cultural ID;
- the portable electronic device determining that the first context has changed from a first state to a second state;
- the portable electronic device presenting a second theme associated with the one of the professional ID, the sports ID, and the cultural ID based on a second context of the portable electronic device, wherein presenting the second theme comprises presenting at least one of a second application, a second media file, a second network service, and a second widget associated with the one of the professional ID, the sports ID, and the cultural ID;
- the portable electronic device determining that the second context has changed from a third state to a fourth state; and
- the portable electronic device loading a different one of the professional ID, the sports ID, and the cultural ID based on the change of the second context from the third state to the fourth state, wherein the different one of the professional ID, the sports ID, and the cultural ID comprises an auto-installation routine or an auto-installation application and comprises a unified plurality of at least three of an application, a media file, a network service, or a widget.

16. The method of claim 15, wherein contexts comprise at least one of a physical location of the portable electronic device, an event taking place at the physical location, a phase of the event, an ambient condition associated with the physical location, and an ambient condition associated with the event.

17. The method of claim 16, wherein ambient conditions comprise at least lighting and background noise proximate to the portable electronic device.

18. The method of claim 15, wherein based on changes in states of context, the portable electronic device one of changes themes within an ID, changes ID, and continues to present the currently loaded theme.

19. The method of claim 18, wherein when determining whether to one of change themes within an ID, change ID, and continue to present the currently loaded theme, the portable electronic device additionally analyzes a history of previous user actions with respect to IDs.

20. The method of claim 15, wherein a presently loaded ID and presently not loaded IDs detect the occurrence of a plurality of events and changes in context that affect the priority of loading of IDs and themes by the portable electronic device.

* * * * *